Nov. 25, 1941.  C. O. CRUMP ET AL  2,264,174
SPRING SUSPENSION FOR TRAILERS
Filed Dec. 15, 1939  3 Sheets-Sheet 1
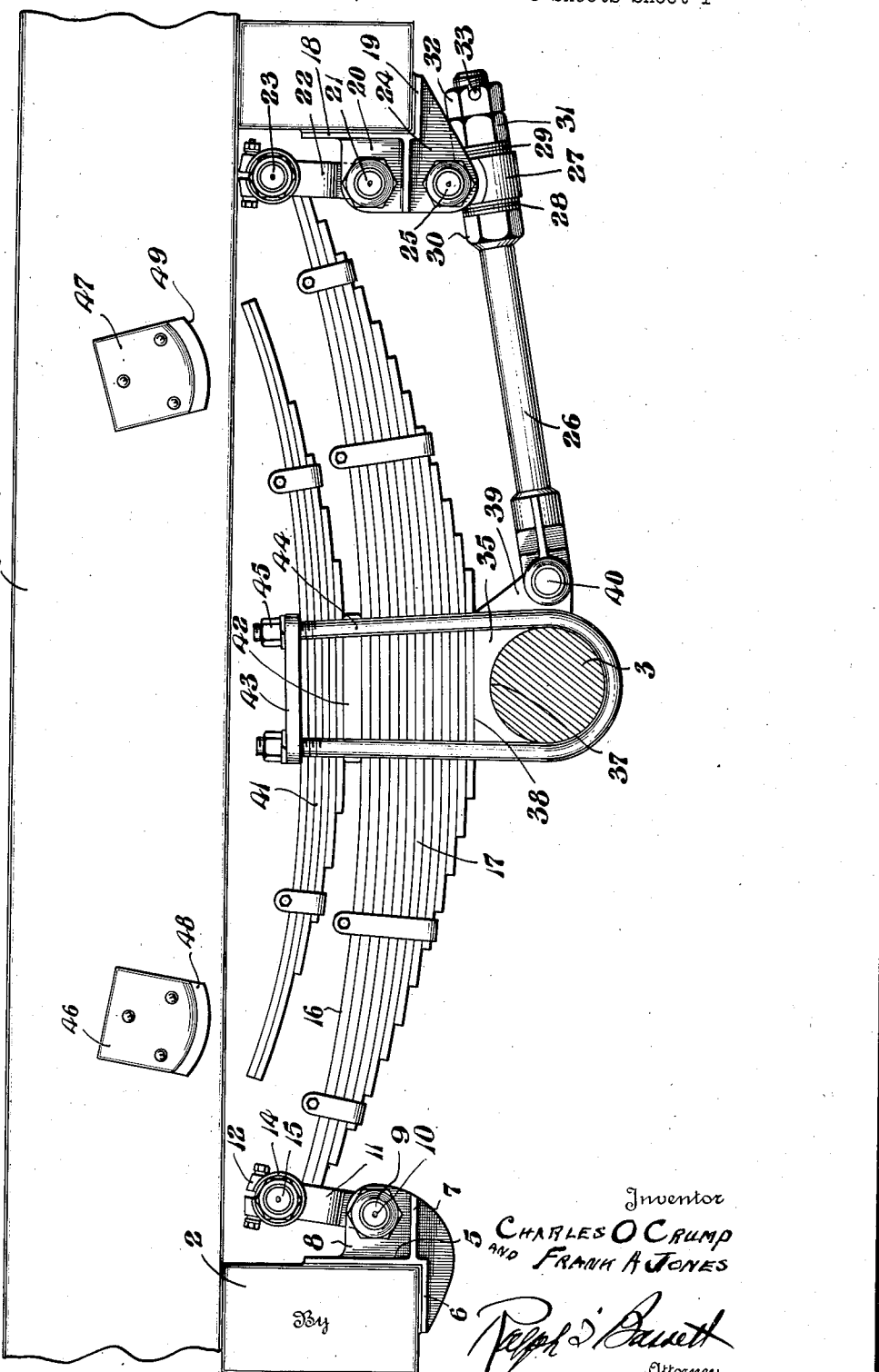
Inventor
CHARLES O CRUMP
AND FRANK A JONES
By
Ralph D. Barrett
Attorney

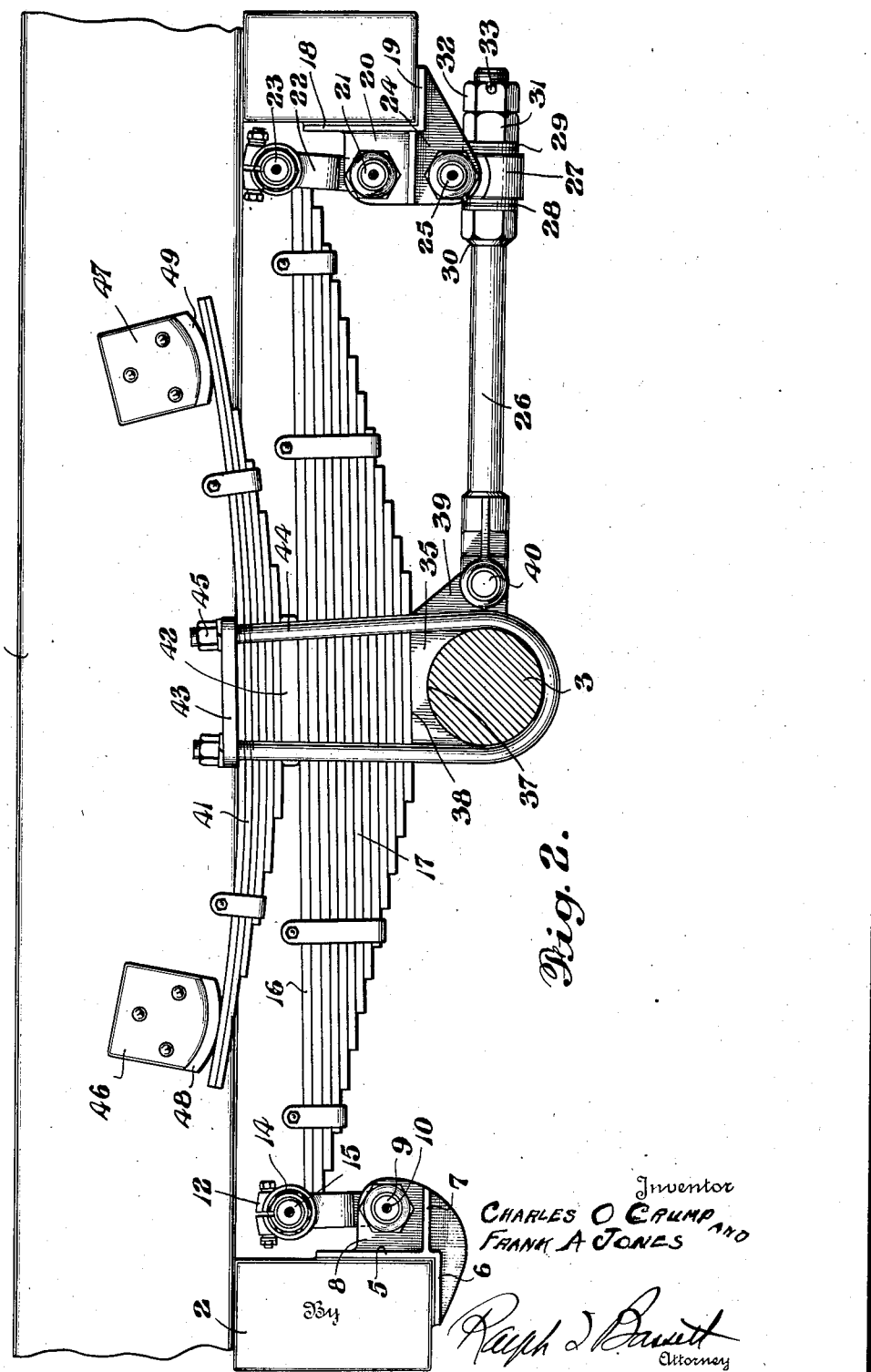

Nov. 25, 1941.    C. O. CRUMP ET AL    2,264,174
SPRING SUSPENSION FOR TRAILERS
Filed Dec. 15, 1939    3 Sheets-Sheet 3
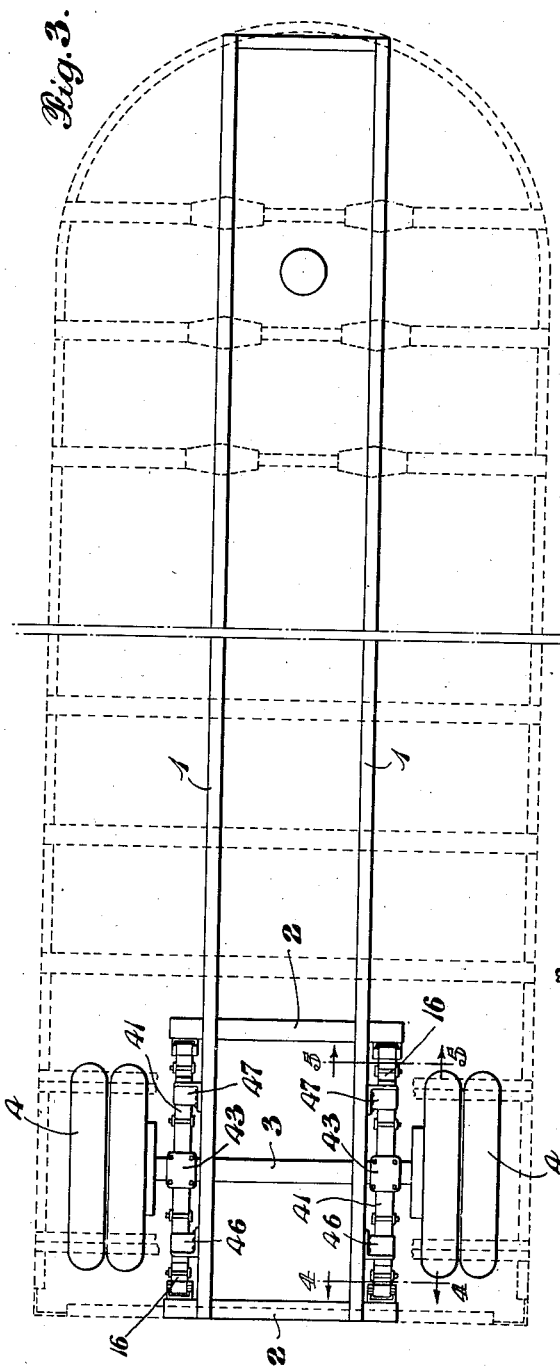
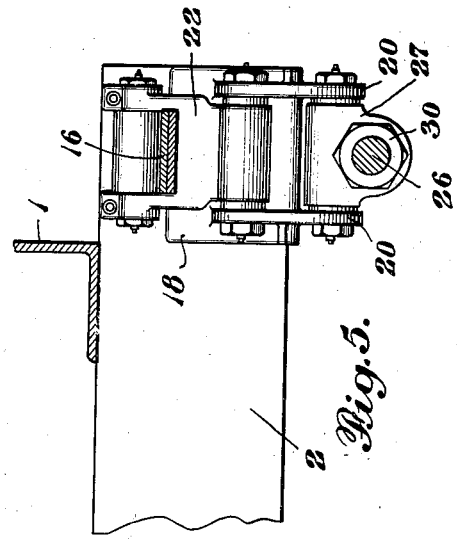
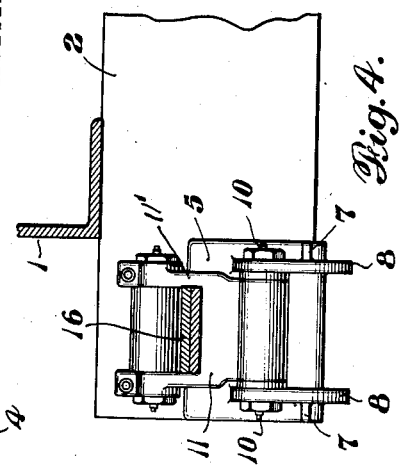
Inventor
CHARLES O. CRUMP AND
FRANK A. JONES Patented Nov. 25, 1941

2,264,174

UNITED STATES PATENT OFFICE 2,264,174

SPRING SUSPENSION FOR TRAILERS

Charles O. Crump, Bristol, Va., and Frank A. Jones, Bristol, Tenn., assignors to Harry M. Daniel, Bristol, Va.

Application December 15, 1939, Serial No. 309,500

5 Claims. (Cl. 280—124)

This invention relates to novel spring suspension means interposed between the chassis and the axle of large trailer truck units and analogous assemblies and comprehends the use of a specific type of spring combined with a definite radius rod arrangement, whereby the rear axle alignment is maintained regardless of the amount of load or the application of the load to the trailer.

One of the main objects of the present invention is to so arrange the center points of rotation of the radius rod with respect to the center line of the axle that alignment is maintained without regard to the amount of deflection in the spring assembly.

Another object of the invention is to suspend the spring shackle from the eye of the spring and to connect the lower pivot shackle below the spring eye thus permitting a greater degree of stability.

A still further object of the invention is the provision of a spring suspension and mounting means therefor in such a manner that these parts are substantially confined within the plane of the supporting cross braces forming a part of the chassis assembly, whereby less space is occupied by these parts, thus rendering it practical to increase the lading capacity of the trailer body.

Other novel features of construction and arrangement of parts will hereinafter more clearly appear by reference to the accompanying drawings forming a part of this specification and wherein like numerals of reference designate corresponding parts throughout the several views, in which, Fig. 1 is a side elevation of one of the suspension units when in unloaded position.

Fig. 2 is a side elevation of the same unit loaded.

Fig. 3 is a plan view of a trailer frame and spring mounting therefor.

Fig. 4 is a transverse sectional view through a spring showing the rear shackle; and Fig. 5 is a transverse sectional view through a spring showing the front shackle.

In the drawings, reference character 1 indicates the longitudinal side frame members of the chassis, 2 transverse spring supporting cross braces or frame members suspended beneath and connected to the side frame members 1, and 3 the axle upon which the wheels 4 are mounted and which support the load by virtue of the spring unit forming the substance of the instant application. It will be noted that the transverse spring supporting suspended cross braces 2 are of relatively substantial depth and as hereinafter pointed out this depth is sufficient to provide the essential strength in the structure and at the same time form a confining area between which the spring mounting is positioned while in loaded condition. Welded or otherwise secured to the cross braces 2 are the supporting angles to which the spring elements and radius rod are connected. The rear supporting member includes the upright wall 5 abutting against the front face of the rear cross brace 2, and the horizontal rearwardly projecting plate 6 which abuts against and is secured to the bottom face of the same cross member 2. The shackle supporting ears 8 are arranged in spaced parallel vertical relation and comprise integral parts of the supporting angle, extending forwardly of the vertical wall 5 and downwardly of the horizontal extension 6. The reinforcing ribs 7 extend horizontally of the outer faces of said ears 8, forwardly from the upright member 5 at a point adjacent its lower edge. The ears 8 are socketed and drilled at opposed points to receive the shackle pin 9, which latter are provided with lubricating fixtures 10. The shackle 11 which is hinged on the shackle pin 9 includes the spaced arms 11' that extend upwardly with their outer faces in substantial alignment with the inner faces of the spaced ears 8, and the shackle arm extremities are formed with the expansible circular sockets 12 enclosing the circular bearings 14 on the ends of the shackle pin or upper shackle bolt 15. This shackle bolt 15 is connected with the rear portion of the upper leaf 16 of the lower spring assembly 17 in the usual manner by providing an eye at the extremity of the leaf 16 which encircles the shackle bolt.

The forward supporting angle is in part identical with the rear supporting angle in that it includes the vertical wall 18 secured to the inner vertical face of the forward cross brace 2 and the horizontal forwardly extending plate 19 which abuts against and is secured to the bottom face of the lower horizontal portion of the same cross member. The spaced ears 20 correspond to the ears 8 of the rear supporting angle and in the identical manner the bottom shackle pin 21 is mounted between the same. The shackle arms 22 swingingly support the upper shackle pin 23 and the associated parts, suspending the spring 17 by means of the upper leaf 16 through the coiled end of which the pin 23 and its bearing extend. In addition to the foregoing the forward angle support embodies the spaced depending ears 24 in which the pin and bushing 25 are mounted for rotary movement to accommodate the movement of the radius rod 26 which projects through and is suspended in the stirrup 27 supported on the shackle pin 25 hereinbefore mentioned. The radius rod 26 is capable of adjustment, embodying in the present instance oppositely arranged spacing washers 28 and 29 which permit longitudinal adjustment of the rod 26 by virtue of the nuts 30 and 31. Lock nut means 32 cooperate with the nuts 30 and 31 to secure the parts in adjustment and a cotter pin 33 may be utilized to lock the fixed adjustment.

The lower short leaf of spring assembly 17 is supported upon a saddle 35 which rests upon the axle 3, this saddle 35 having a concaved lower face 37 of semi-circular form for neatly engaging the upper face of the axle 3. The upper face 38 of the saddle 35 is flat and upon this flat surface the lower leaf of the spring 17 is mounted. Spaced projecting ears 39 extend forwardly of the saddle 35 and are formed with aligned openings which receive the rotatably mounted rear radius rod supporting pin 40, which as in the instance of shackles and analogous structure includes a bearing and lubricating connections, the latter preferably projecting through the ears to facilitate the lubricating operation. The horizontal axis of the registering openings formed in the ears 39 for the reception of the radius rod, pin and bearing assembly is substantially in a horizontal plane with the horizontal axis of the axle 3 thus aligning the thrust of the radius rods substantially midway of the axle and in this manner providing maximum bracing effect and alignment during the spring loaded conditions when the radius rod is more or less in horizontal alignment as shown in Fig. 2 of the drawings.

The spring is of the dual type in that it embodies the upper leaf assembly 41 which is centered and supported on the plate 42 arranged midway of the top of the spring assembly 17. An upper plate 43 is provided for the upper spring leaf assembly 41 and the two spring groups 41 and 42 are clamped to the axle by virtue of the U-clips 44, which latter snugly engage against the side walls of the springs and of the rear radius rod support and extend through openings in the upper plate 43 and are bolted in position as shown by virtue of threaded extremities and nuts 45. The elongated vertically extending arms of the U-clips 44 engage the vertical side walls of the springs and radius rod support and keep the radius rod and two spring sections in vertical alignment for uniform relative movement between these parts.

The upper spring is of the free type i. e., the extremities are not connected by shackles or other fixed or movable means to the coacting spring supported body but contact the stop members 46 and 47 during loading as well as during vibration between the chassis frame and axle. The stop members 46 and 47 which cooperate with the free extremities of the spring 41 are provided with arcuate outwardly projecting wall portions 48 and 49, the contours of which are formed from a line perpendicular to a line tangent to the spring curve in its unloaded position, thus providing maximum free cooperation between the parts and reducing friction at the points of engagement.

It will be observed that the assembly heretofore described in detail is in the first instance, when in loaded condition as shown in Fig. 2, of such a character that the two sets of leaf springs are substantially confined within the horizontal plane of the cross brace 2 and that when in this same loaded position the radius rod is in substantially horizontal plane with its longitudinal axis intersecting the horizontal axis of the axle to which its rear end is attached. This insures maximum bracing effect and alignment, and a reduced amount of occupied area both in loaded and unloaded conditions whereby the loaded capacity of the supported body can be increased with a minimum of height. The latter feature is brought about mainly by the arrangement of the shackles with their upper freely swinging portions each connected with the springs and extending vertically and above the supporting angles. It will be noted that the forward stop member 47 is positioned above the lower horizontal plane of the rear spring stop 46 to permit a proper relative range of movement at the forward end. It will also be noted that these stop members 46 and 47 are secured to the lower portions of the outer face of the longitudinal chassis frame elements 1 and that by this arrangement the vertical movement of the springs independent of interference by the body or its supporting frame is of maximum limit and thus springs of substantially any reasonable design or size may be utilized without loss of capacity due to relative height of cooperative parts.

Further the relationship between the radius rod and the particular spring suspension is of importance, it being noted from Fig. 5 that the radius rod is positioned beneath and centrally of the spring assembly 17, so that the longitudinal axis of the radius rod 26 is in a vertical plane extending through the longitudinal center of the spring. This adds materially to the compact nature of the development and inherently increases the alignment of the vehicle parts under all conditions. Maintaining the radius rod and the spring in their respective alignment is brought about by virtue of the clips 44, the arms of which engage the side walls of the saddle 35 to which the radius rod 26 is connected and the sides of the leaf spring assemblies 17 and 41. The structure shown and described is such as to bring about the maintenance of the rear axle alignment regardless of the amount of the load or the application of the load. Further with the center points of rotation of the connecting rod 26 located as described with respect to the center line of the axle, the desired alignment is maintained without regard to the amount of deflection in the spring assembly. In addition material stability is secured in the assembly by the particular arrangement of the shackle i. e., by having the springs suspended from the free upwardly extending arms of the hangers and the load transmitted through means of this particular spring suspension to the axles which latter are aligned in the manner described by the use of the novel arrangement of radius rods.

We claim:

1. A spring suspension for a vehicle including longitudinal frame members and an axle, cross braces on opposite sides of the axle secured to said longitudinal frame members, spring shackle supports connected to the cross braces, shackles carried by the shackle supports having their spring suspending extremities arranged above fixed pivots, springs suspended from said shackles, said springs when fully loaded to be confined above a plane defined by the lower faces of said cross braces, a saddle mounted on said axles for centrally supporting said springs, a pivot pin carried by said saddle, said pivot pin having its longitudinal axis parallel to and in substantially the same horizontal plane as the axis of said axle, a radius rod having one extremity formed with a transverse opening for receiving said pivot pin and its opposite end supported by and swung beneath one of said spring shackle supports at a point substantially above said pivot pin whereby under loaded conditions said radius rod will move to substantially horizontal position to more positively retain the axle in alinement.

2. A spring suspension for a vehicle including longitudinal frame members and an axle, cross braces on opposite sides of the axle, spring shackle supports connected to the cross braces, a leaf spring assembly mounted upon the axle and connected to the shackle supports, and means for maintaining the axle in alignment regardless of the amount of load comprising a radius rod extending between one of the spring shackle supports and said axle, said radius rod being connected at its axle end to a pivot arranged in substantially a horizontal plane with the longitudinal axis of the axle and its opposite end so positioned that upon maximum load conditions it will be substantially horizontal.

3. A spring suspension for a vehicle including longitudinal frame members and an axle, cross braces spaced on opposite sides of the axle and extending beyond said frame members to provide a pair of spring supporting surfaces at each side of said longitudinal frame members, supporting angles secured to the supporting surfaces, saddles mounted on the axle in alignment with and interposed between the supporting angles, leaf spring assemblies mounted on said saddles, means engaging about each side of each group of leaf spring assemblies for maintaining the same in vertical alignment with the side walls of the saddle, spring shackles carried by said supporting angles, said shackles including lower fixed pivots and shackle pin connections, said shackle pin connections securing the leaf spring assemblies to said shackles for movement above their fixed pivots, radius rods connecting the saddles with adjacent supporting angles, said radius rods having their center points of rotation adjacent the axles in a plane substantially horizontal with the plane of the axle axis and their outer extremities secured to said supporting angles beneath the lower faces of the attached cross members, whereby upon maximum load conditions said radius rods will have their longitudinal axis in a horizontal plane extending through the axis of the axle and the spring will be above a plane defined by the lower faces of the cross braces.

4. A spring suspension for a vehicle including longitudinal frame members and an axle, cross braces spaced on opposite sides of the axle depending from the longitudinal frame members, spring shackle supports connected to the cross braces, springs secured to the axle and to the spring supports, said springs having such a deflection that they will be confined when under maximum load conditions above a plane defined by the lower faces of said cross braces, and radius rods arranged beneath each spring, said radius rods being interposed between and pivotally connected at their extremities to the axles and the adjacent cross member, the radius rod pivot members at the axle having their axis in substantially a common horizontal plane with the axis of the axle at all times, while the axis of the pivot member of the radius rods at the cross member are normally positioned above a horizontal plane defining the upper face of the axle but are shiftable under loaded conditions to a common plane with the axis of the pivot members adjacent the axle, whereby the said axle is more positively retained in proper alinement under loaded conditions.

5. A spring suspension for a vehicle including longitudinal frame members, shackle supports spaced on opposite sides of the axle and supported by the frame members, spring shackles connected to the shackle supports, a leaf spring assembly mounted upon the axle and connected to the spring shackles, and means for maintaining the axle in alignment with respect to the vehicle comprising an adjustable radius rod extending between one of said spring shackle supports and said axle, said adjustable radius rod being connected at its axle end to a pivot arranged in substantially a horizontal plane with respect to the longitudinal axis of the axle and the pivot at the opposite end of said rod being so positioned that a horizontal plane passing through same also bisects the angle defined by said rod in its normal travel, so that the longitudinal alignment of the axle relative to the frame is substantially the same under full load and no load conditions.

CHARLES O. CRUMP.
FRANK A. JONES.